United States Patent [19]
Rheingold

[11] Patent Number: 5,495,926
[45] Date of Patent: Mar. 5, 1996

[54] HYDRAULIC POWER TRANSMISSION APPARATUS

[76] Inventor: Lawrence M. Rheingold, 10965 Clairmont Cir., Tamarac, Fla. 33321-5803

[21] Appl. No.: 247,332

[22] Filed: May 23, 1994

[51] Int. Cl.$^6$ .................................................. F16D 31/02
[52] U.S. Cl. .......................................... 192/60; 251/250
[58] Field of Search ............................. 192/60, 59, 61; 251/250, 309

[56] References Cited

U.S. PATENT DOCUMENTS

| | | | |
|---|---|---|---|
| 1,466,622 | 8/1923 | Hele-Shaw | 192/60 |
| 1,609,429 | 12/1926 | Rockwell | 192/60 |
| 1,786,356 | 12/1930 | McFarland | 192/60 |
| 1,952,354 | 3/1934 | Bedford | 192/60 |
| 2,125,617 | 8/1938 | Niemann | 192/58 B |
| 2,153,372 | 4/1939 | Hyde | 192/60 X |
| 2,888,118 | 5/1959 | Dymeck et al. | 192/59 |
| 3,083,803 | 4/1963 | Gilles | 192/60 |
| 3,897,933 | 8/1975 | Christenot | 251/309 X |
| 4,795,014 | 1/1989 | Rheingold | 192/60 |

FOREIGN PATENT DOCUMENTS

948642  8/1949  France ........................ 192/60

*Primary Examiner*—Rodney H. Bonck
*Attorney, Agent, or Firm*—Fitch, Even, Tabin & Flannery

[57] ABSTRACT

A hydraulic power transmission apparatus having improved valving for accurately regulating the flow of hydraulic material between a pair of cylinders in either of two opposite directions. The valve has a circularly cylindrical occluding member disposed in occluding position within the hydraulic material pathway connecting the two cylinders to separate the pathway into separate first and second sides. The occluding member seats loosely within a plurality of arcuate seating surfaces and is displaceable upon change in direction of flow of the hydraulic material, under the influence of the hydraulic material, from a first position in abutment with a first plurality of seating surfaces to a second position in abutment with a second plurality of seating surfaces. The occluding member is freely rotatable about its longitudinal axis within the seating surfaces and has at least one slot formed therein. The slot is moveable, upon rotation of the occluding member, from a first position in which the slot is in fluid communication with both the first and second sides of the housing pathway to allow the hydraulic material to flow between the first and second cylinders through the slot, to a second position in which the slot is out of fluid communication with at least one of the first and second sides of the pathway to that hydraulic material is prevented from flowing between the first and second cylinders. The power transmission is suitable for use as a bicycle transmission, light vehicle transmission, and wind power or natural force generator drives.

20 Claims, 5 Drawing Sheets

HYDRAULIC POWER TRANSMISSION APPARATUS

FIELD OF THE INVENTION

The invention pertains to power transmission apparatus, and more particularly pertains to hydraulic power transmission apparatus suitable for use as a bicycle transmission.

BACKGROUND OF THE INVENTION

The type of power transmission apparatus of the type to which the present invention pertains is found in U.S. Pat. No. 4,795,014 entitled "Power Transmission Apparatus" which is incorporated by reference as if fully reproduced herein. The aforementioned patent discloses a power transmission apparatus wherein power is transmitted between a camshaft and a rotating cylinder block through a pair of pistons reciprocally and slidably disposed within a pair of adjacent cylinder heads in the cylinder block. The interiors of the pair of adjacent cylinder heads communicate with one another through a pair of sliding plates disposed therebetween which serve as valves to regulate the flow of hydraulic material. Sliding of the plates provides orifices of variable size. By sliding the plates to reposition the valves, the size of the orifices defined by the plates is variable to change the power transmission apparatus between a first mode in which a direct connection is provided between the camshaft and the cylinder block whereby the pistons are prevented from moving relative to the cylinder block and accordingly rotate therewith, and a second mode in which the relative speeds of the camshaft and the cylinder block are varied with respect to one another.

More specifically, the valves used in regulating the flow of hydraulic material in the aforementioned patented device comprises a pair of plates which are slidably disposed within channels defined in associated cylinder heads. Each plate has an elongated central opening which is greater in length than the distance between the pair of cylinders. In an open position, the opening in the slidable plate conmnunicates with both cylinders to permit flow of hydraulic material between the two cylinders. In a closed position, the opening in the slidable plate communicates with only one of the cylinders, thus preventing flow of hydraulic material between the two cylinders.

SUMMARY OF THE INVENTION

In accordance with the present invention, a hydraulic power transmission apparatus is provided having the aforementioned arrangement of two cylinders communicating with one another through a pair of hydraulic material pathways; though it will be apparent from the following discussion that for certain applications more than two cylinders may be employed. The flow of hydraulic material through the hydraulic material pathways of the transmission apparatus is controlled by an improved valving arrangement. The valving arrangement is particularly well suited for withstanding the significant pressures and repetitive reversals in the direction of flow of the hydraulic material which are realized in hydraulic power transmission apparatus of the type to which the present invention pertains.

The housing of the power transmission apparatus has interior surfaces which define the aforementioned pair of hydraulic material pathways. The interior surfaces of the housing define a plurality of arcuate seating surfaces in the hydraulic material pathway. A circularly cylindrical occluding member is disposed within each of the hydraulic material pathways of the hydraulic transmission, with its longitudinal axis extending generally perpendicularly to the direction of flow of the hydraulic material. The occluding member is retained within the seating surfaces of the housing for rotational movement of the occluding member within the seating surfaces about its longitudinal axis. The occluding member is disposed in occluding position within the hydraulic material pathway of the housing so as to divide the housing pathway into a first side and a second side.

The circularly cylindrical occluding member may have at least one slot therein extending inwardly from its periphery, and extending substantially perpendicularly to the longitudinal axis of the occluding member. Rotating means may be provided for rotating the occluding member about its longitudinal axis. The slot may be moveable, by rotation of the occluding member, between a first position, in which the slot of the occluding member is in fluid communication with both the first and second sides of the housing pathway to allow the hydraulic material to flow between the first and second sides of the housing pathway through the slot in the occluding member, and a second position in which the slot of the occluding member is out of fluid communication with at least one of the first and second sides so that the occluding member blocks the flow of hydraulic material between the first and second sides of the housing pathway.

In accordance with one aspect of the invention, the plurality of seating surfaces of the housing may comprise a plurality of arcuate seating surfaces having a curvature corresponding to the curvature of the periphery of the cylindrical occluding member. The occluding member may seat loosely within the seating surfaces so that the occluding member is displaceable, generally perpendicularly to its longitudinal axis, within the seating surfaces. The occluding member thus may be moved into abutment and sealing engagement with a first set of seating surfaces when acted upon by hydraulic material flowing in a first direction, and moved into abutment with a second set of seating surfaces when acted upon by hydraulic material flowing in a second, opposite direction.

The occluding member may be rotated between its open and closed positions by a reciprocable rack having linearly spaced teeth in engagement with radially spaced teethe on the occluding member. Reciprocation of the rack thus rotates the corresponding occluding member to facilitate accurate control of the flow of hydraulic material between the pair of cylinders of the hydraulic power transmission apparatus in either direction. Thereby, reciprocation of the rack provides a variable relationship between the driving and driven elements of the power transmission apparatus.

BRIEF DESCRIPTION OF THE DRAWINGS

In the drawings, wherein like elements are referenced alike.

DETAILED DESCRIPTION OF THE INVENTION

Figures 1, 2, 3:
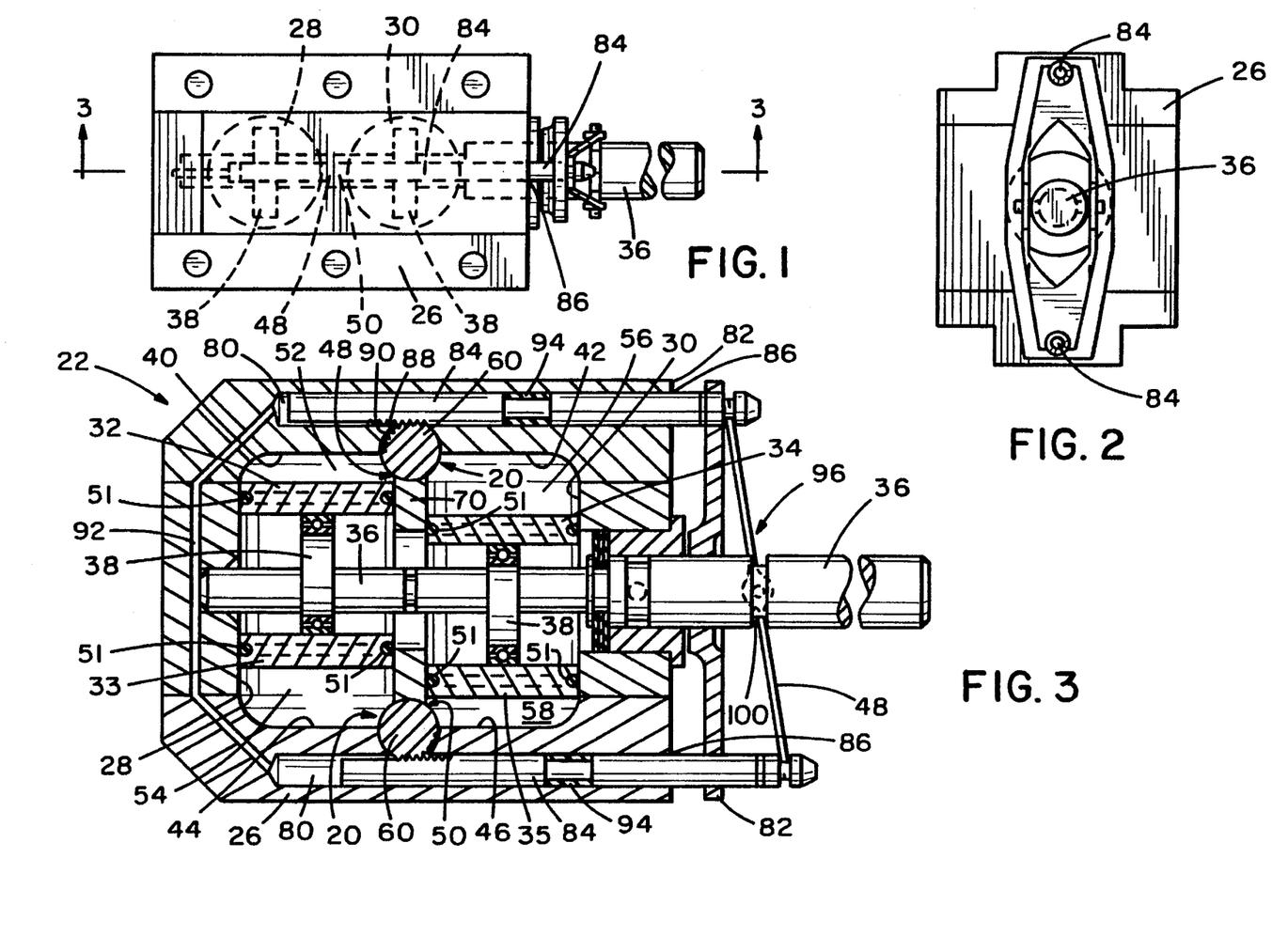
FIG. 1 is a top plan view of a hydraulic power transmission apparatus embodying various features of the present invention.
FIG. 2 is an end elevational view of the hydraulic power transmission apparatus of FIG. 1.
FIG. 3 is a sectional view of the power transmission apparatus, taken along line 3—3 of FIG. 1, shown with the valves in their fully open positions.
Figure 6:
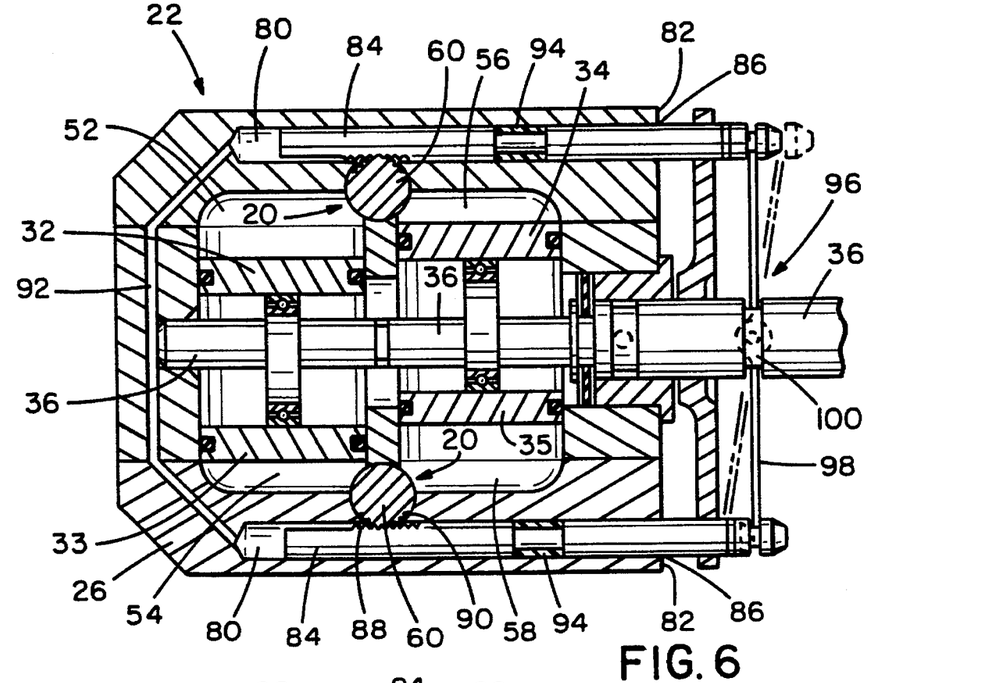
FIG. 6 is a sectional view of the power transmission apparatus with the see-saw bracket pivoted to move the valves to their closed positions.
Figure 9:
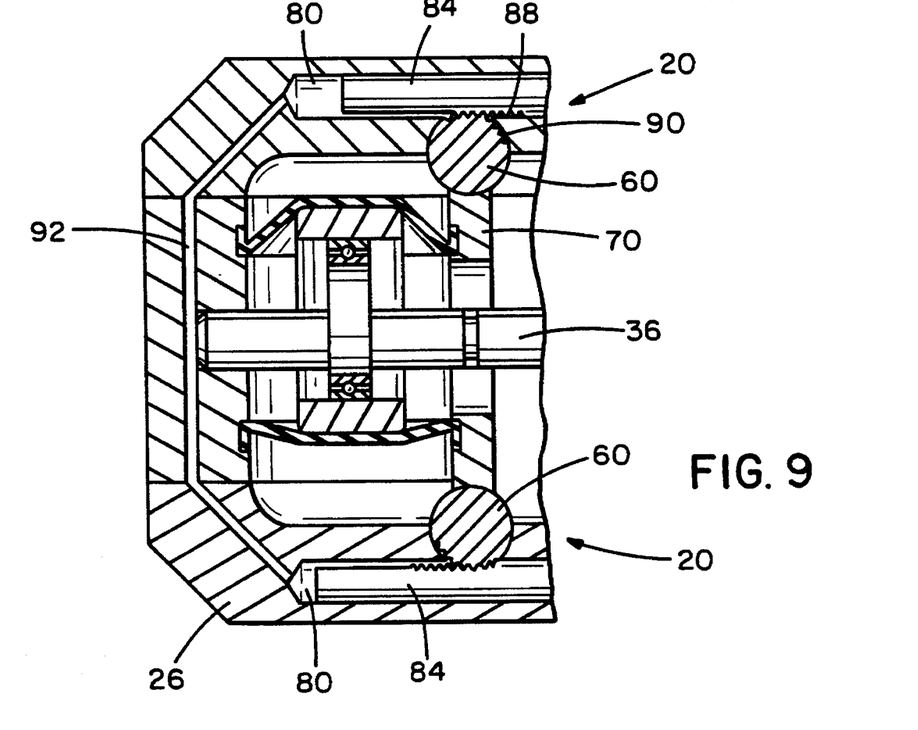
FIG. 9 is an enlarged, partial sectional view of an alternative power transmission apparatus embodying various features of the present invention, showing flexible diaphragms replacing the reciprocating cylinders.

Power transmission apparatus embodying various features of the present invention are illustrated in FIGS. 3, 6 and 9, and referred to generally by reference numeral 22. The power transmission apparatus may be of the type disclosed in U.S. Pat. No. 4,795,014 entitled "Power Transmission Apparatus" which is incorporated by reference as if fully reproduced herein.

The power transmission apparatus 22 includes a rotatable cylinder block 26 defining a pair of parallel first and second cylinders 28 and 30. A first pair of pistons 32 and 33, and second pair of pistons 34 and 35 are disposed for reciprocal movement within respective cylinders 28 and 30. A rotatable camshaft 36 is disposed coaxially of the cylinder block 26 with cams 38 mounted thereon which drive the pistons 32, 33, 34 and 35 in reciprocating motion when the camshaft 36 is rotated relative to the cylinder block 26. A positive hydraulic seal of the camshaft is achieved with the use of multiple washers. The first pair of pistons 32 and 33 reciprocate together, and 180° out of phase with the second pair of pistons 34 and 35, which also reciprocate together. The power transmission apparatus 22 will be described specifically with reference to an embodiment wherein the camshaft 36 is the driving member and the cylinder block 26 is the driven member; however, it should be understood that the functions can be reversed. Additionally, the power transmission apparatus is described herein as having two cylinders; however, for heavier applications four cylinders with two at 90° from of camshaft throw may provide a smoother flow of power. Manifestly, the present invention is not limited to the two cylinder embodiment discussed herein, and a wide variety of cylinder arrangements may be employed without departing from the inventive concepts which comprise the invention.

The adjacent ends 40, 42 and 44, 46 of the cylinders 28 and 30 communicate with one another through respective hydraulic material pathways 48 and 50. The pistons 32 and 33 define first and second hydraulic material chambers 52 and 54 within the first cylinder 28, and the pistons 34 and 35 define third and fourth hydraulic material chambers 56 and 58 within the second cylinder 30. Hence, chambers 52 and 56 communicate with one another through first hydraulic material pathway 48, and chambers 54 and 58 communicate with one another through second hydraulic material pathway 50. The cylinder space between the pair of pistons 32 and 33 and between the pair of pistons 34 and 35 are completely filled with hydraulic material to balance pressures against the piston heads. This is important, as the internal block and piston volumes must be filled completely so as to offer back-pressure to the motion of the pistons and prevent blow-by past the rings 51. The rings 51 center the pistons in their cylinders, but are not capable of holding back the full pressure of the hydraulic material forced by the piston heads into the block. The pistons 32, 33, 34 and 35 each have rings 51 to help prevent additional hydraulic material from entering into the spaces between the piston pairs.

With reference to the view of FIG. 3, upon rotation of the camshaft 36, pistons 32 and 33 may be displaced downwardly within the first cylinder 28 while pistons 34 and 35 are displaced upwardly within the second cylinder 30. Hydraulic material is thereby displaced from chamber 56 into chamber 52 through the first hydraulic material pathway 48, and hydraulic material is displaced from chamber 54 into chamber 58 through the second hydraulic material pathway 50. Upon further rotation of the camshaft 36, pistons 32 and 33 may be displaced upwardly within the first cylinder 28 while pistons 34 and 35 are displaced downwardly within the second cylinder 30. Hydraulic material is thereby displaced from chamber 52 into chamber 56 through the first hydraulic material pathway 48, and hydraulic material is displaced from chamber 58 into chamber 54 through the second hydraulic material pathway 50. During normal operation of the power transmission apparatus 22, the direction of flow of hydraulic material through the hydraulic material pathways 48 and 50 is repeatedly reversed. The hydraulic material may be a slurry comprised of a plurality of solid spheres or other shapes of relatively small diameter or microscopic diameter and a lubricating fluid.

By controlling the rate of flow of hydraulic material through the first and second hydraulic material pathways 48 and 50, the amount of the torque exerted on the camshaft 36 which is imparted to the cylinder block 26 may be controlled. That is, torque exerted on the camshaft 36 results in axial force on the pistons 32, 33, 34 and 35, and in torque on the cylinder block 36 that varies as a function of resistance to reciprocation of the pistons within the cylinder block.

Valves, referred to generally by reference numeral 20, are disposed within both the first and second hydraulic material pathways 48 and 50 to provide accurate control of the flow of hydraulic material through the respective hydraulic material pathways 48 and 50. With reference to the enlarged views of FIGS. 4 and 5 and FIGS. 7 and 8, the structure and operation of the valves 20 will now be described in detail. For conciseness, the following description pertains to only one of the two valves 20 used in the illustrated power transmission apparatus 22, specifically the valve 20 disposed in hydraulic material pathway 48; however, it should be understood that both valves are the same.

The valve 20 is disposed in the hydraulic material pathway 48 such that all hydraulic material must flow through the valve 20 to pass between chambers 52 and 56 in either direction. The valve 20 comprises a circularly cylindrical occluding member 60 disposed within a plurality of arcuate seating surfaces 62, 64, and 66 of the cylinder block which define the hydraulic material pathway 48. The occluding member 60 rotates within the seating surfaces 62, 64 and 66 about its longitudinal axis. The occluding member 60 has a slot 68 therein extending inwardly from its periphery which allows hydraulic material to flow therethrough generally perpendicularly to the longitudinal axis of the occluding member 60 when the valve is rotated to its open position. As described below, rotation of the occluding member 60 about is longitudinal axis moves the slot 68, whereby the rotational position of the occluding member 60 determines the extent of flow of hydraulic material between chambers 52 and 56.

Arcuate seating surface 66 is defined by the end surface of the wall 70 which divides the first and second cylinders 28 and 30. Arcuate seating surfaces 62 and 64 are also defined by the cylinder block 26 of the power transmission apparatus 20. The arcuate seating surfaces 62, 64, and 66 are proportioned in relation to one another, and in relation to the size of the occluding member 60, such that the occluding member 60 is displaceable within the seating surfaces 62, 64 and 66 in a direction generally perpendicular to its longitudinal axis.

Figure 4:
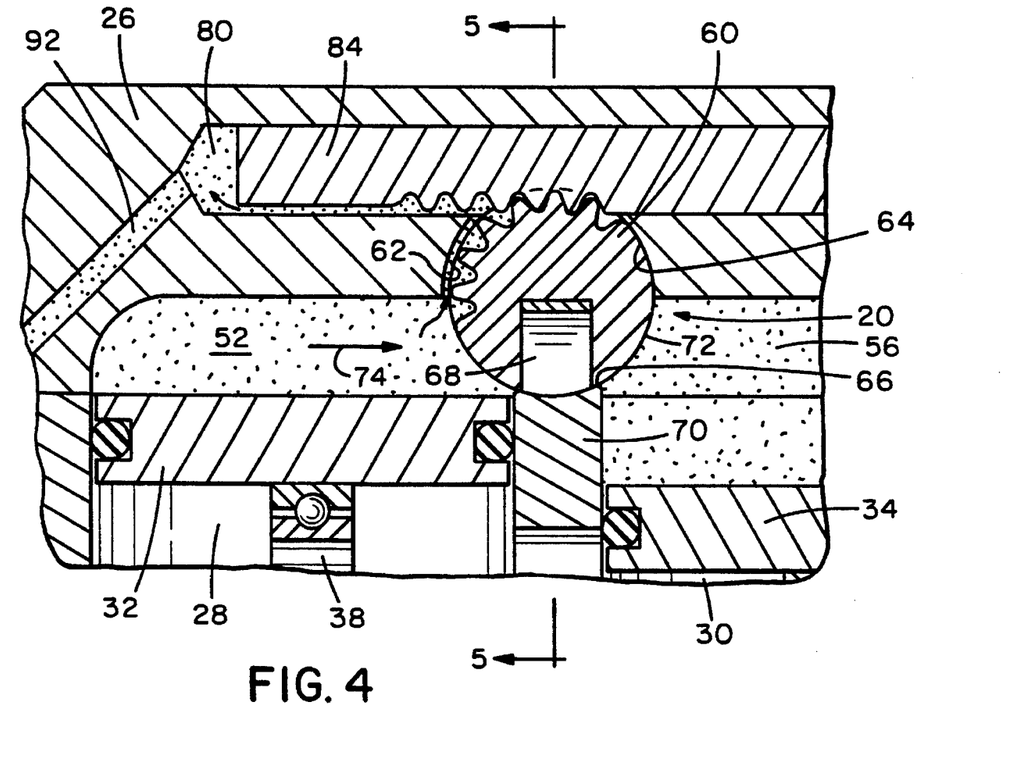
FIG. 4 is an enlarged partial sectional view of the valve portion of the hydraulic power transmission apparatus of FIG 1.

When hydraulic material flows in a first direction, i.e. from chamber 52 to chamber 56, as indicated by arrow 74 in FIG. 4, the occluding member is shifted under the influence of the hydraulic material in the direction of flow to a position out of contact with seating surface 62 and into abutment with seating surfaces 64 and 66, as illustrated in FIG. 4. During operation of the power transmission apparatus 22, the force of the hydraulic material urges the occluding member 60 tightly against the seating surfaces 64 and 66 to effect a substantially leakproof seal between the peripheral surface 72 of the occluding member 60 and the arcuate seating surfaces 64 and 66.

Figure 7:
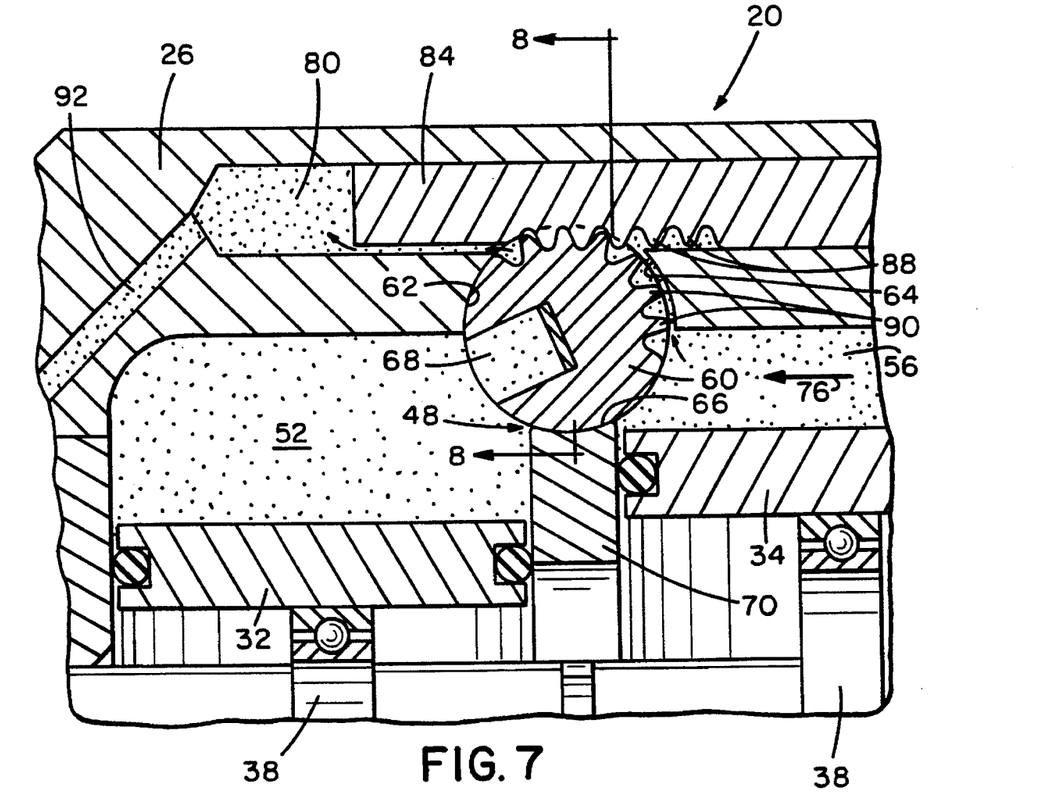
FIG. 7 is an enlarged partial sectional view of the valve portion of the power transmission apparatus of FIG. 6, showing the valve in its fully closed position.

As the pistons 32 and 34 reciprocate, the hydraulic material repeatedly changes flow direction from the direction indicated by arrow 74 in FIG. 4 to the opposite direction indicated by arrow 76 in FIG. 7. Upon reversal in direction of the flow of the hydraulic material to the direction indicated by arrow 76, the occluding member 60 is displaced under the influence of the hydraulic material out of contact with seating surface 64 and into abutment with seating surfaces 62 and 66 as shown in FIG. 7. The force of the hydraulic material urges the occluding member 60 tightly against the seating surfaces 62 and 66 to effect a substantially leakproof seal between the peripheral surface 72 of the occluding member 60 and the arcuate seating surfaces 62 and 66.

In accordance with one aspect of the present invention, the valve 20 is particularly well suited for handling high pressures of the type realized in hydraulic power transmission apparatus 22. The greater the pressure which the hydraulic material exerts on the occluding member 60, the more tightly the occluding member 60 bears against its seating surfaces, and thus the tighter the seal which is formed preventing flow of hydraulic material past the occluding member 60. The tight seal is realized with the flow in either direction. Since, in the structure of the valve 20 of the present invention, the occluding member 60 preferably seats loosely with its seating surfaces 62, 64 and 66 so as to be displaceable perpendicularly to its longitudinal axis, the costs associated with the machining to high tolerances is eliminated. However, the space between the occluding member 60 and the seating surfaces 62, 64, and 66 are preferably made sufficiently close that there is insignificant flow of the hydraulic material between the periphery 72 of the occluding member 60 and the seating surfaces 62 or 64, even upon rapid changes in the direction of flow of hydraulic material. That is, upon a change in flow direction of the hydraulic material, the occluding member 60 is shifted into sealing engagement with its respective seating surface 62 or 64 before a significant amount of hydraulic material passes between the periphery 72 of the occluding member 60 and the respective seating surface 62 or 64.

Figure 8:
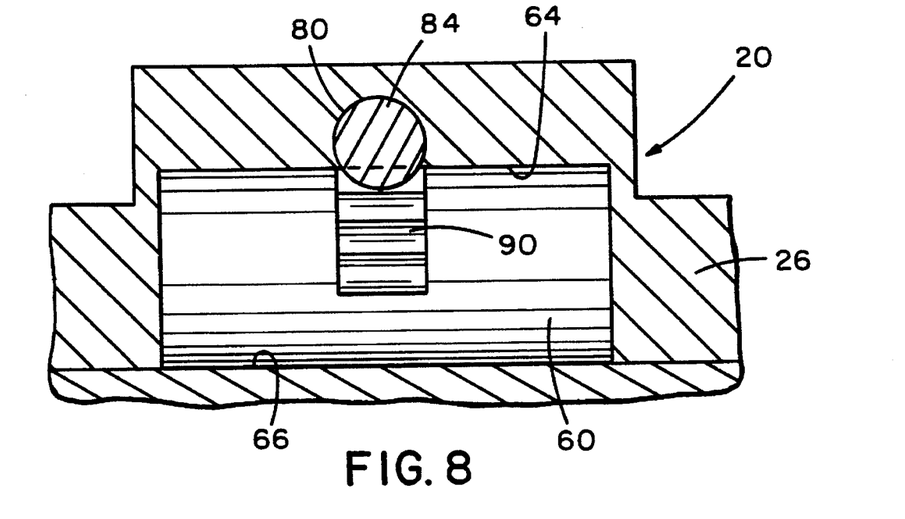
FIG. 8 is an enlarged partial sectional view of the power transmission apparatus, taken along line 8—8 of FIG. 7.

As discussed above, the occluding member 60 has a slot 68 which is moveable, upon rotation of the occluding member 60 about its longitudinal axis, from a first position in which the slot 68 is in fluid communication with both chamber 52 and chamber 56 to allow hydraulic material to flow between the chambers 52 and 56 through the slot 68 (see FIGS. 4 and 5), and a second position in which the slot 68 of the occluding member 60 is out of fluid communication with either or both chamber 52 and chamber 56 to prevent hydraulic material from flowing between chambers 52 and 56 (see FIGS. 7 and 8). The occluding member 60 extends across the hydraulic material pathway 48 interconnecting chambers 52 and 56, generally perpendicularly to the direction of flow of hydraulic material. Only a central portion of the occluding member 60 is disposed within the hydraulic material pathway 48. The ends of the occluding member 60 are rotatably disposed within the housing in a manner which allows the above-mentioned displacement of the occluding member 60 perpendicularly to its longitudinal axis. The slot 68 is disposed on the central portion of the occluding member 60 so that the slot 68 is disposed within the hydraulic material pathway 48.

Figure 5:
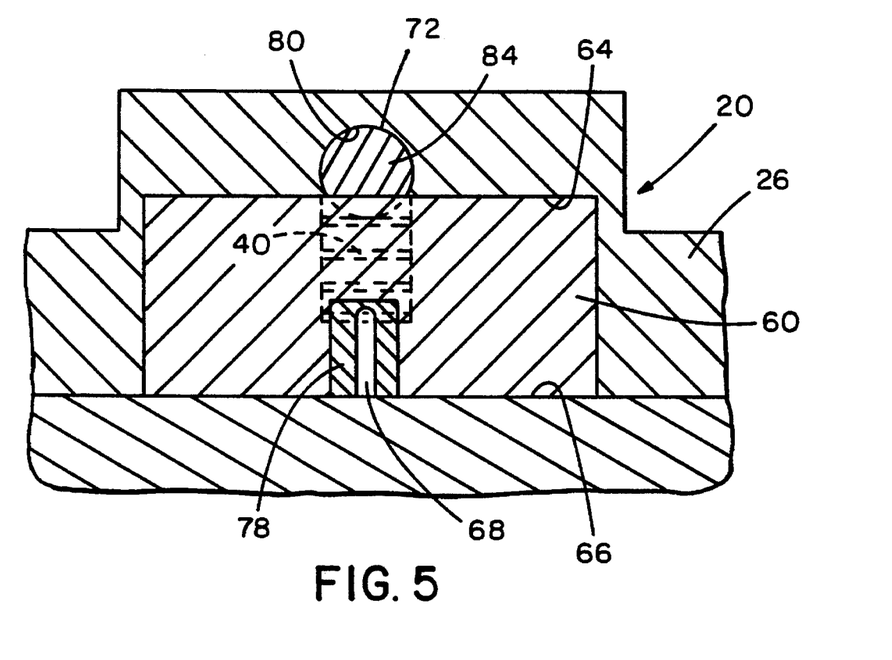
FIG 5 is an enlarged partial sectional view of the power transmission apparatus, taken along line 5—5 of FIG. 4.

As discussed above, by rotating the occluding member 60 about its longitudinal axis, the slot 68 is moveable from the fully open position of FIGS. 4 and 5, in which the entire cross section of the slot 68 is exposed to the hydraulic material; to the fully closed position of FIGS. 7 and 8, in which no portion of the slot 68 is exposed to the hydraulic material; or any intermediate position between the fully open and closed positions. The fully open position of FIGS. 4 and 5 allows the greatest amount of hydraulic material to flow through the slot 68, and the fully closed position of FIGS. 7 and 8 allows substantially no hydraulic material to flow through the slot 68. By rotating the occluding member 60 to any selective rotational position intermediate the aforementioned fully open and fully closed positions, the amount of hydraulic material allowed to flow through the slot 68 and, hence, through the hydraulic material pathway 48, may be accurately controlled. In the illustrated embodiment, in which the valve 20 is shown used in conjunction with a hydraulic power apparatus 22, accurate control of the rate of flow of hydraulic material past the valve 20 provides accurate control of the ratio between the rotational speeds of the camshaft 36 and the cylinder block 26.

As mentioned previously, in addition to the valve 20 disposed in hydraulic material pathway 48 to regulate the flow of hydraulic material between chambers 52 and 56, the power transmission apparatus 22 includes a second valve 20 disposed in hydraulic material pathway 50 to regulate the flow of hydraulic material between chambers 54 and 58. It is important that the two valves 20 used in the power transmission apparatus 22 be rotated simultaneously so that both valves 22 are always generally at the same open or closed position.

In one mode of operation, with the occluding members 60 rotated to their fully closed positions illustrated in FIGS. 7 and 8, the power transmission apparatus 22 provides a direct connection between the camshaft 36 and the cylinder block 26. In this mode of operation, the pistons are prevented from moving relative to the cylinder block 26, and accordingly rotate therewith, whereby the camshaft and the cylinder block rotate at the same velocity. In a second mode of operation illustrated in FIGS. 4 and 5, wherein the occluding members 60 are rotated to bring their slots 68 into communication with hydraulic material on both sides of the occluding member, the pairs of pistons 32,33 and 34,35 are driven in reciprocating movement 180° out of phase with one another by the cams 38 disposed eccentrically on the camshaft 36. The relative speeds of the camshaft 36 and the cylinder block 26 are varied with respect to one another, and the pistons reciprocate at a frequency equal to the difference between their respective speeds.

During operation of the power transmission apparatus 22, the continuous oscillation of hydraulic material through the valves 60 may result in the hydraulic material becoming heated. The viscosity of hydraulic materials tends to decrease as the temperature of the hydraulic material increases. To overcome the problem of greater flow of the hydraulic material through the slot 68 upon decrease in the viscosity of the hydraulic material, the slot is preferably lined with a metal lining having a suitable thermal expansion coefficient. The metal lining expands with increased heat to narrow the size of the slot 68 as the temperature of the hydraulic material increases. By selecting an appropriate metal for the lining of the slot 68 and an appropriate hydraulic material, the narrowing of the slot 68, realized by expansion of the lining, may offset the decrease in viscosity of the hydraulic material. Thereby, for any given rotational position of the occluding member 60, the ratio of the velocity of the camshaft 36 relative to the cylinder block 26 may be maintained substantially constant despite increased temperature of the hydraulic material. In the illustrated embodiment, a generally U-shaped metallic insert 78 defines the slot 68 and provides the desired thermal expansion of the slot 68. By way of example, it was found that a bi-metallic lining of laminated brass-steel or aluminum-tin provides good results.

In the illustrated embodiment, the means for rotating the occluding member 60 about its longitudinal axis to change the setting of the valve 20 comprises a rack and pinion arrangement. The rotatable cylinder block 26 defines a pair of bores 80 extending inwardly from the actuating end 82 of the cylinder block 26. The bores 80 extend adjacent the ends 42, 44 and 44, 46 of the cylinders 28 and 30, generally perpendicularly to the longitudinal axis of the occluding members 60. Racks 84 are slidable within respective bores 80, and extend outwardly of the cylinder block 26 through apertures 86. The racks 84 have longitudinally spaced teeth 88 which engage with peripherally spaced teeth 90 on the occluding member 60 such that upon sliding of the racks 84 the occluding members 60 in engagement with the racks 84 are rotated.

The teeth 90 are disposed over approximately 135° of the periphery of the occluding member and the center of the slot 68 is disposed approximately 135° from one end of the teeth 90 and approximately 45° from the other end of the teeth, as best shown in FIGS. 4 and 7.

The pair of bores 80 are in fluid communication with one another through bypass duct 92 which provides lubrication of the rack and pinion arrangement. With reference to FIG. 4, when the hydraulic material exerts a force on the occluding member 60 in the direction of arrow 74, the occluding member 60 is displaced out of contact with seating surface 62. The pressure of the hydraulic material causes a small portion of hydraulic material to flow into the gaps between the occluding members 60 and their respective seating surfaces 62, and into the bores 80 where it provides lubrication to reciprocation of the racks 84. Likewise, with reference to FIG. 7, when the hydraulic material exerts a force on the occluding member 60 in the direction opposite arrow 74, i.e., in the direction of arrow 76, the occluding member 60 is displaced out of contact with seating surface 64 and into abutment with seating surfaces 62 and 66. The pressure of the hydraulic material causes a small portion of the hydraulic material to flow into the gap between the occluding members 60 and their respective seating surfaces 64, and into the bores 80. From the bores 80, the hydraulic material flows into the bypass duct 92 interconnecting the pair of bores 80. The bypass duct 42 serves as a reservoir to assure that a pressure balance and adequate lubrication of the racks is maintained. The hydraulic material provides lubrication for low friction sliding of the racks 84 within their bores 80, and low friction engagement between the teeth 88 of the racks 84 and the teeth 90 of the occluding member 80. The racks 84 have seals 94, which are preferably tubular plastic type collars, to prevent hydraulic material from advancing past the seals and leaking out through the apertures 86. The hydraulic material in the bypass duct pushes the racks 84 in opposing directions with balanced pressure between them. Air in the bypass duct would be compressed.

There are a wide variety of means for reciprocating the racks 84 to effect rotation of the occluding members 60. It is important in selecting an appropriate means for reciprocating the racks that the two occluding members 60 of the power transmission apparatus 22 be rotated simultaneously.

In the embodiment of FIGS. 3 and 6, a seesaw lever arrangement 96 is employed to alternatingly reciprocate the racks 84. The teeth 88 of one rack 84 are disposed on one side of its corresponding occluding member 60 and teeth 88 of the other rack 84 are disposed on the other side of its corresponding occluding member 60. Seesaw bracket 98 is disposed in a groove 100 on the camshaft 36. The bracket 98 is freely rotatable on the camshaft 36 and is pivotable on the camshaft 36 between the angled position of FIG. 3 and the angled position illustrated in phantom in FIG. 6. With the bracket 98 in the position of FIG. 3, the occluding members 60 are rotated to their fully open position. With the bracket 98 in the skeletal position shown in FIG. 6, the occluding members 60 are rotated to their fully closed positions. The seesaw arrangement 96 allows the occluding members 60 to be rotated, one clockwise and the other counterclockwise, to any selective position between the aforementioned fully open and fully closed positions to facilitate accurate regulation of the flow of hydraulic material through the hydraulic material pathways 48 and 50.

Figure 10:
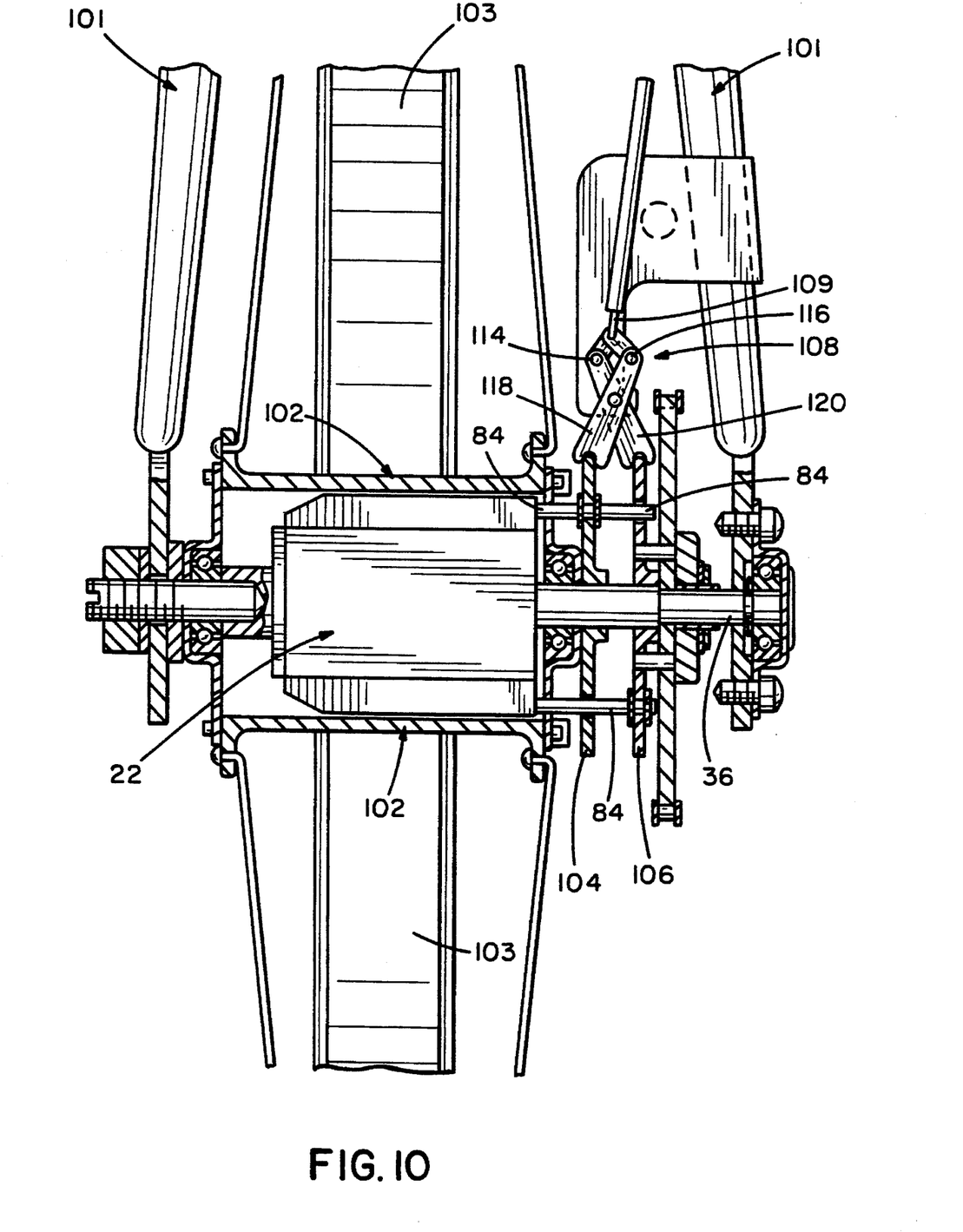
FIG. 10 is a sectional view of another alternative embodiment of a power transmission apparatus embodying various features of the present invention and disposed within a tire hub.

FIG. 10 illustrates an embodiment wherein the power transmission apparatus 22 is disposed in the hub 102 of a rear wheel 103 of a bicycle 101. FIG. 10 also illustrates another arrangement for effecting simultaneous rotation of the occluding members 60. The arrangement of FIG. 10 employs reciprocating racks 84 for effecting rotation of the occluding members 60, as discussed above, but with a different arrangement for reciprocating the racks 84. A first rack 84 is engaged with a first slidable plate 104, and a second rack is engaged with a second slidable plate 106. A tong assembly 108 is operable by a typical bicycle cable 10d to simultaneously slide the first and second plates 104 and 106 toward and away from one another. More specifically, the upper rack 84, as viewed in FIG. 10, is affixed to plate 104 and passes through an aperture 110 in plate 106. The lower rack 84 as viewed in FIG. 10, is affixed to plate 106 and passes through an aperture 112 in plate 104. Upon upward pulling of the cable 10d, the upper ends 114 and 116 of the links 118 and 120 are moved toward one another and the lower ends 122 and 124 of the links 118 and 120 also move toward each other. The drawing together of the lower ends 122 and 124 of the links 118 and 120 effects simultaneous reciprocation of the plates 104 and 106 and their respective racks 84, with the upper rack 84 moving to the right and the lower rack 84 simultaneously moving to the left. The rack actuating plate has an opening or means to engage and lock with one or more pins fixed to the cylinder block when the racks are moved to their fully closed positions. The locking engagement of the actuating plate with the pins of the cylinder block holds a 1:1 ratio between the drive shaft and the cylinder block.

Upon downward movement of the cable 109, the upper ends 114 and 116 of the links 118 and 120 are moved apart from one another and the lower ends 122 and 124 of the links 118 and 120 also move apart from one another. The outward separation of the lower ends 122 and 124 of the links 118 and 120 effects simultaneous reciprocation of the plates 104 and 106 and their respective racks 84, with the upper rack 84 moving to the left and the lower rack simultaneously moving to the right. This effects simultaneous rotation of the pair of occluding members 60 in either direction between open and closed positions.

FIG. 9 illustrates an alternative power transmission apparatus 120, which is the same as the aforementioned preferred power transmission apparatus 20 except that diaphragms 121 are employed, as discussed in the aforementioned patented power transmission apparatus which has been incorporated by reference.

From the foregoing it will be appreciated that the present invention provides a novel and useful hydraulic power transmission apparatus having a valve which may be particularly well suited for the apparatus. The power transmission apparatus of the present invention is particularly well suited for such applications as a bicycle transmissions, light vehicle transmission, and wind power or natural force generator drives. The invention is not limited to the embodiments described above, but rather is defined by the following claims.

What is claimed is:

1. A power transmitting apparatus, comprising:

a cylinder block defining a pair of hollow cylinders;

a pair of pistons disposed for reciprocation in each of said cylinders;

hydraulic material disposed within said cylinders;

said cylinder block defining at least one flow passageway connecting said cylinders with one another to permit reciprocating flow of said hydraulic material therethrough in response to reciprocation of said pistons, said cylinder block also defining a plurality of arcuate seating surfaces within said flow passageway; and valve means disposed in said flow passageway for variable control of flow between said cylinders, the valve means comprising:

a circularly cylindrical occluding member having a longitudinal axis extending generally perpendicularly to the flow passageway and engaged by the seating surfaces of the flow passageway for rotational movement of the occluding member about its longitudinal axis, said occluding member being in occluding position within said flow passageway and proportioned in relation to the size of the hydraulic material pathway of the housing so as to divide said flow passageway into a first side and a second side;

said occluding member having at least one slot therein extending substantially radially inwardly from its periphery, and extending substantially perpendicularly to said longitudinal axis; and rotating means for rotating said occluding member about its longitudinal axis to move said at least one slot between a first position in which the slot of the occluding member is in fluid communication with both said first and second sides of said housing pathway to allow first and second sides of said housing pathway to allow said hydraulic material to flow between said first and second sides through said slot, and a second position in which the slot of the occluding member is out of fluid communication with at least one of said first and second sides so that said hydraulic material is prevented from flowing between said first and second sides through said slot; wherein said occluding member is displaceable generally perpendicularly to its longitudinal axis, under the influence of the hydraulic material, from a first position in abutment with a first set of said plurality of seating surfaces to a second position in abutment with a second set of said plurality of seating surfaces.

2. A power transmission apparatus in accordance with claim 1 wherein said occluding member is movable to any selective position intermediate of said first and second occluding member positions to selectively control the flow of hydraulic material from said first cylinder to said second cylinder.

3. A power transmission apparatus in accordance with claim 1, wherein said first set of seating surface and said second set of seating surfaces have at least one common seating surface.

4. A power transmission apparatus in accordance with claim 1, wherein said seating surfaces comprise a plurality of arcuate surfaces having a curvature corresponding to the curvature of the periphery of the circularly cylindrical occluding member.

5. A power transmission apparatus in accordance with claim 1 wherein said occluding member comprises peripherally disposed teeth and said rotating means comprises a rack having linearly disposed teeth engaged with said occluding member teeth, the occluding member being rotatable about its longitudinal axis upon linear translation of said rack.

6. A power transmission apparatus in accordance with claim 1 wherein said hydraulic fluid comprises a slurry.

7. A power transmission apparatus in accordance with claim 6 wherein said slurry comprises a plurality of solid spheres of relatively small diameter and a lubricating fluid.

8. A power transmission apparatus in accordance with claim 1 wherein said power transmission apparatus has a cylinder space between each pair of pistons, and wherein hydraulic material is disposed within said cylinder space between each said pair of pistons.

9. A power transmitting apparatus, comprising:

a cylinder block defining a pair of hollow cylinders;

a pair of pistons disposed for reciprocation in each of said cylinders;

hydraulic material disposed within said cylinders;

said cylinder block defining at least one flow passageway connecting said cylinders with one another to permit reciprocating flow of said hydraulic material therethrough in response to reciprocation of said pistons, said cylinder block also defining a plurality of arcuate seating surface within said flow passageway; and valve means disposed in said flow passageway for variable control of flow between said cylinders, the valve means comprising:

a cylindrical occluding member having a longitudinal axis extending generally perpendicularly to the flow passageway and engaged by the seating surfaces of the flow passageway for rotational movement of the occluding member about its longitudinal axis, said occluding member being in occluding position within said flow passageway and proportioned in relation to the size of the hydraulic material pathway of the housing so as to divide said flow passageway into a first side and a second side;

said occluding member having at least one slot therein extending substantially radially inwardly from its periphery, and extending substantially perpendicularly to said longitudinal axis; and rotating means for rotating said occluding member about its longitudinal axis to move said at least one slot between a first position in which the slot of the occluding member is in fluid communication with both said first and second sides of said housing pathway to allow first and second sides of said housing pathway to allow said hydraulic material to flow between said first and second sides through said slot, and a second position in which the slot of the occluding member is out of fluid communication with at least one of said first and second sides so that said hydraulic material is prevented from flowing between said first and second sides through said slot;

wherein said one or more slots in said occluding member are defined at least in part by a thermally expanding material which expands in proportion to increased temperature of the hydraulic material to reduce the size of the slots.

10. A power transmission apparatus in accordance with claim 9 wherein the viscosity of the hydraulic material decreases with increased temperature, and the thermally expanding material of the slot expands in predetermined proportion to increased temperature of the hydraulic material such that the rate of flow of said hydraulic material through said one or more slots is substantially constant for any given rotational position of the occluding member upon increased temperature of the hydraulic material.

11. In a power transmission apparatus having a housing with surfaces defining a hydraulic material pathway through which hydraulic material flows between a pair of cylinders, said housing surfaces defining a plurality of seating surfaces, a valve for regulating the flow of hydraulic material through the hydraulic material pathway, the valve comprising:

a circularly cylindrical occluding member having a longitudinal axis extending generally perpendicularly to the direction of flow of hydraulic material through the pathway and engaged by the seating surfaces of the housing for rotational movement of the occluding member about its longitudinal axis, said occluding member being disposed in occluding position within said hydraulic material pathway to divide said pathway into a first side and a second side;

said occluding member having at least one slot therein; and rotating means for rotating said occluding member about its longitudinal axis to move said at least one slot between a first position in which the flow of the occluding member is in fluid communication with both said first and second sides of said housing pathway to allow said hydraulic material to flow through said slot between said first and second cylinders, and a second position in which the slot of the occluding member is out of fluid communication with at least one of said first and second sides so that said hydraulic material is prevented from flowing between said first and second cylinders;

wherein said power transmission apparatus has a housing defining said plurality of seating surfaces and said occluding member is displaceable generally perpendicularly to its longitudinal axis, under the influence of the hydraulic material, from a first position in abutment with a first set of said plurality of seating surfaces to a second position in abutment with a second set of said plurality of seating surfaces.

12. A power transmission apparatus in accordance with claim 11 wherein said occluding member is movable to any selective position intermediate of said first and second occluding member positions to selectively control the flow of hydraulic material from said first cylinder to said second cylinder.

13. A power transmission apparatus in accordance with claim 11 wherein said first set of seating surfaces and said second set of seating surfaces have at least one common seating surface.

14. A power transmission apparatus in accordance with claim 11 wherein said seating surfaces comprise a plurality of arcuate surfaces having a curvature corresponding to the curvature of the periphery of the circularly cylindrical occluding member.

15. A power transmission apparatus in accordance with claim 11 wherein said occluding member comprises peripherally disposed teeth and said rotating means comprises a rack having linearly disposed teeth engaged with said occluding member teeth, the occluding member being rotatable about its longitudinal axis upon linear translation of said rack.

16. A power transmission apparatus in accordance with claim 11 wherein said hydraulic fluid comprises a slurry.

17. A power transmission apparatus in accordance with claim 16 wherein said slurry comprises a plurality of solid spheres of relatively small diameter and a lubricating fluid.

18. In a power transmission apparatus having a housing with surfaces defining a hydraulic material pathway through which hydraulic material flows between a pair of cylinders, said housing surfaces defining a plurality of seating surfaces, a valve for regulating the flow of hydraulic material through the hydraulic material pathway, the valve comprising:

a circularly cylindrical occluding member having a longitudinal axis extending generally perpendicularly to the direction of flow of hydraulic material through the pathway and engaged by the seating surfaces of the housing for rotational movement of the occluding member about its longitudinal axis, said occluding member being disposed in occluding position within said hydraulic material pathway to divide said pathway into a first side and a second side;

said occluding member having at least one slot therein; and rotating means for rotating said occluding member about its longitudinal axis to move said at least one slot between a first position in which the slot of the occluding member is in fluid communication with both said first and second sides of said housing pathway to allow said hydraulic material to flow through said slot between said first and second cylinders, and a second position in which the slot of the occluding member is out of fluid communication with at least one of said first and second sides so that said hydraulic material is prevented from flowing between said first and second cylinders;

wherein said one or more slots in said occluding member are defined at least in part by a thermally expanding material which expands in proportion to increased temperature of the hydraulic material to reduce the size of the slots.

19. A power transmission apparatus in accordance with claim 18 wherein the viscosity of the hydraulic material decreases with increased temperature, and the thermally expanding material of the slot expands in predetermined proportion to increased temperature of the hydraulic material such that the rate of flow of said hydraulic material through said one or more slots is substantially constant for any given rotational position of the occluding member upon increased temperature of the hydraulic material.

20. A power transmission apparatus comprising:

a cylinder block defining a pair of hollow cylinders;

a pair of pistons disposed for reciprocation in each of said cylinders;

hydraulic material disposed within said cylinders;

said cylinder block defining at least one flow passageway connecting said cylinders with one another to permit reciprocating flow of said hydraulic material therethrough in response to reciprocation of said pistons; and a valve disposed in said flow passageway for variable control of flow between said cylinders;

each said pair of pistons defining a cylinder space therebetween;

said cylinder space between each said pair of pistons being substantially filled with hydraulic material.

* * * * *

UNITED STATES PATENT AND TRADEMARK OFFICE
CERTIFICATE OF CORRECTION

PATENT NO. : 5,495,926
DATED : March 5, 1996
INVENTOR(S) : Lawrence M. Rheingold It is certified that error appears in the above-indentified patent and that said Letters Patent is hereby corrected as shown below:

Column 10, line 22, change "surface" to --surfaces--.

Column 10, line 44, after "each" insert --said--.

Column 10, line 58, change "surface" to --surfaces--.

Column 11, line 56, change "flow" to --slot--.

Signed and Sealed this

Third Day of September, 1996

*Attest:*

BRUCE LEHMAN

*Attesting Officer*     *Commissioner of Patents and Trademarks*